(12) United States Patent
Pan et al.

(10) Patent No.: US 8,908,533 B2
(45) Date of Patent: Dec. 9, 2014

(54) SUPPORTING OAM ON PROTECTING CONNECTIONS IN SHARED MESH PROTECTION ENVIRONMENT

(75) Inventors: Ping Pan, San Jose, CA (US); Rajan Rao, Cupertino, CA (US); Biao Lu, Saratoga, CA (US); Sri Mohana Satya Srinivas Singamsetty, Cupertino, CA (US); Ann Q. Gui, Cupertino, CA (US); Maneesh Jain, Uttaranchal (IN); Anthony W. Jorgenson, Fremont, CA (US); Jan Bialkowski, San Jose, CA (US); Khuzema Pithewan, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 151 days.

(21) Appl. No.: 13/248,111

(22) Filed: Sep. 29, 2011

(65) Prior Publication Data

US 2012/0176911 A1 Jul. 12, 2012

Related U.S. Application Data

(63) Continuation-in-part of application No. 12/872,895, filed on Aug. 31, 2010, now Pat. No. 8,426,886.

(60) Provisional application No. 61/353,438, filed on Jun. 10, 2010, provisional application No. 61/483,042, filed on May 5, 2011.

(51) Int. Cl.
*H04L 12/26* (2006.01)
*H04L 12/723* (2013.01)

(52) U.S. Cl.
CPC .................. *H04L 43/10* (2013.01); *H04L 45/50* (2013.01)
USPC ...................................................... 370/241.1

(58) Field of Classification Search
USPC .......... 370/215–228, 236.1–236.2, 351–439, 370/241–252
See application file for complete search history.

(56) References Cited

U.S. PATENT DOCUMENTS

| | | | |
|---|---|---|---|
| 7,468,944 B2 * | 12/2008 | Nishioka et al. | 370/225 |
| 2003/0117950 A1 * | 6/2003 | Huang | 370/220 |
| 2004/0190444 A1 | 9/2004 | Trudel et al. | |
| 2004/0205238 A1 * | 10/2004 | Doshi et al. | 709/241 |
| 2006/0193257 A1 | 8/2006 | Behzadi | |
| 2007/0211623 A1 | 9/2007 | Nishioka | |
| 2008/0056294 A1 * | 3/2008 | Maeda et al. | 370/437 |
| 2008/0117806 A1 | 5/2008 | Xu | |
| 2008/0285440 A1 | 11/2008 | Adler | |

(Continued)

OTHER PUBLICATIONS

RFC5586 MPLS Generic Associated Channel, Vigoureux, M., Bocci, M.,Swallow, G., Aggarwal, R., and D. Ward The Internet Society, May 2009.

(Continued)

*Primary Examiner* — Kwang B Yao
*Assistant Examiner* — Juvena Loo
(74) *Attorney, Agent, or Firm* — Dunlap Codding LLC; David L. Soltz

(57) ABSTRACT

A method for detecting the liveliness and synchronizing the control-plane and data-plane on protecting connections in a shared mesh network environment through methods for probing the protecting connection conditions by sending in-band messages; and synchronization of control plane and data plane by using LSP-ping messages on the protecting connections.

23 Claims, 14 Drawing Sheets

(56) References Cited

U.S. PATENT DOCUMENTS

| | | | |
|---|---|---|---|
| 2010/0208662 A1 | 8/2010 | Fuste Vilella et al. | |
| 2010/0232287 A1 | 9/2010 | Long et al. | |
| 2011/0058472 A1 | 3/2011 | Owens et al. | |
| 2011/0064404 A1 | 3/2011 | Eiger et al. | |
| 2011/0090786 A1* | 4/2011 | Liu et al. | 370/221 |
| 2011/0305450 A1 | 12/2011 | Pan et al. | |
| 2012/0176911 A1 | 7/2012 | Pan et al. | |

OTHER PUBLICATIONS

RFC4872 RSVP-TE Extensions for E2E GMPLS Recovery, J.P. Lang, Y.Rekhter, D. Papadimitriou, The Internet Society, May 2007.

ITU-T Recommendation G.709 "Interfaces for the optical transport network (OTN)".

RFC3473 Generalized Multi-Protocol Label Switching (GMPLS) Signaling Resource ReserVation Protocol—Traffic Engineering (RSVP-TE) Extensions, Berger (Ed.), The Internet Society, Jan. 2003.

RFC4379 Detecting Multi-Protocol Label Switched (MPLS) Data Plane Failures, Kombella, K. and Swallow, G., The Internet Society, Feb. 2006.

RFC3032 MPLS Label Stack Encoding, E. Rosen, D. Tappan, G. Fedorkow, Y. Rekhter, D. Farinacci, T. Li, A. Conta, The Internet Society, Jan. 2001.

\* cited by examiner

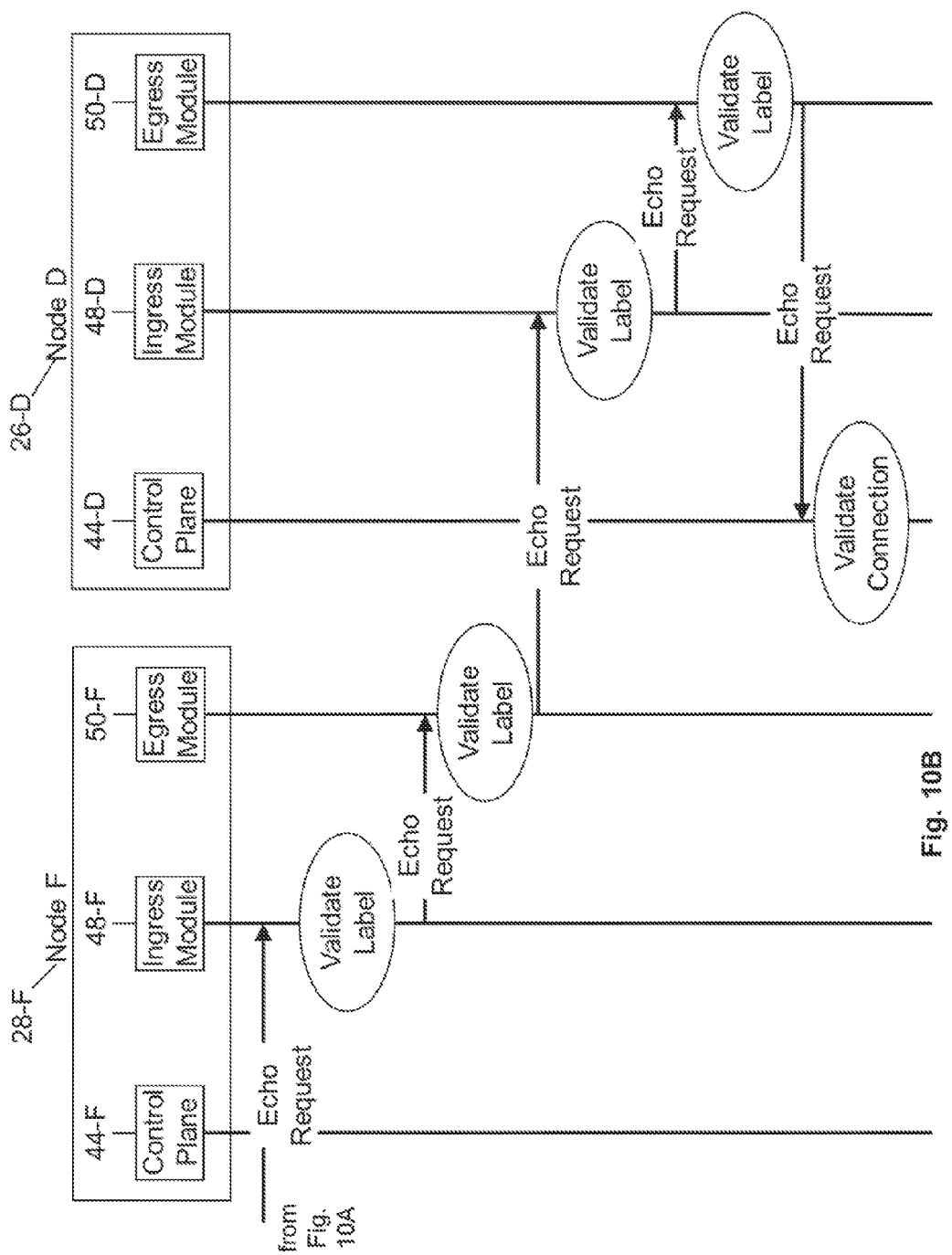

SUPPORTING OAM ON PROTECTING CONNECTIONS IN SHARED MESH PROTECTION ENVIRONMENT

CROSS-REFERENCE TO RELATED APPLICATIONS

The present patent application is a continuation in part of United States patent application identified by U.S. Ser. No. 12/872,895 filed on Aug. 31, 2010, now U.S. Pat. No. 8,426, 886 "Activation Signaling in Transport Networks", which claims the benefit under 35 U.S.C. 119(e) of U.S. Provisional Application Ser. No. 61/353,438, filed on Jun. 10, 2010. The present patent application also claims the benefit of U.S. Provisional Application Ser. No. 61/483,042 filed on May 5, 2011, "Supporting OAM on Protecting Connections in Shared Mesh Protection Environment". The content of each patent application set forth above is hereby expressly incorporated by reference herein in their entirety.

FIELD OF THE DISCLOSURE

The disclosure generally relates to methods and apparatuses in shared mesh protection networks for querying availability of resources on active and inactive protecting connections, and synchronizing the control-plane and data-plane on the protecting connections, in support of Operation, Administration and Maintenance (OAM) of the protecting connections. Though the methodologies set forth herein are in the context of a shared mesh network that is optically based, such methodologies may apply to all transport networks that utilize protection and recovery provisioning.

BACKGROUND

A circuit switched network usually includes multiple switch nodes which are arranged in a topology referred to in the art as a "shared mesh network". Within the shared mesh network, user traffic can be transported between any two locations using predefined connections specifying particular links and/or switch nodes for conveying the user traffic.

The switch nodes are each provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS)".

Generalized Multiprotocol Label Switching (GMPLS) includes multiple types of optical channel data unit label switched paths including protection and recovery mechanisms which specifies predefined (1) working connections within a shared mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. A protecting connection may also be referred to as a protection path. A first node of a path is referred to as a headend node. A last node of a path is referred to as a tailend node. Data is initially transmitted over the optical channel data unit label switched path, referred to as the working connection, and then, when a working connection fails, the headend node or tailend node activates one of the protecting connections for redirecting data within the shared mesh network.

Shared Mesh Protection (SMP) is a common protection and recovery mechanism in transport networks, where multiple paths can share the same set of network resources for protection purposes.

An exemplary mesh network 20 is shown in FIG. 1, by way of example. In FIG. 1, the mesh network 20 includes switch nodes 22 (hereinafter referred to as "nodes" 22) and labeled as A, B, C, D, E, F, G, H, I, J and K. Some of the nodes 22 are denoted as a headend node 24 or tailend node 26 for a particular path in accordance to the path setup direction. Other nodes 22 are known as intermediate nodes 28. In this example, the mesh network 20 includes headend nodes 24-A and 24-K; tailend nodes 26-D and 26-H; and intermediate nodes 28-B, 28-C, 28-E, 28-F, 28-G, 28-I, and 28-J. The mesh network 20 in FIG. 1 also includes two working connections 30a and 30b; and two protecting connections 32a and 32b. Thus, the working connections 30a and 30b are formed by the nodes {24-A, 28-B, 28-C, 26-D}, and {24-K, 28-J, 28-I, 26-H} respectively; and the protecting connections 32a and 32b are formed by the nodes {24-A, 28-E, 28-F, 28-G, 26-D}, and {24-K, 28-G, 28-F, 28-E, 26-H} respectively. Connections are established via control planes prior to a failure of the mesh network 20. The switch nodes A-K are coupled by communication links 34a-k, which can be fiber optic cables, electronics cables, wireless communication links, or the like.

In this example, the communication links 34f and 34e between intermediate nodes 28-E, 28-F and 28-G are shared by both protecting connections 32a and 32b. The working connections 30 and the protecting connections 32 can be established by the nodes A-K using GMPLS protocols prior to any network failure. The working connections 30 and the protecting connections 32 may be bi-directional or co-routed.

In Shared Mesh Protection, initially operators set up both working connections 30 and protecting connections 32. During setup, operators specify the network resources, for example, switch nodes A-K, communication links 34, and timeslots, for each connection. The operators will activate the working connections 30 with the appropriate resources on the intermediate nodes 28; however, the protecting connections 32 will be reserved but the resources on the intermediate nodes 28, will not be initially activated. Depending on network planning requirements, such as Shared Risk Link Group (SRLG), protecting connections 32 may share the same set of resources on intermediate nodes 28-E, 28-F, and 28-G. The resource assignment is a part of the control-plane Connection Admission Control (CAC) operation taking place on each node.

Upon detection of working connection 30 failure (for example, if the communication link 34b between intermediate nodes 28-B and 28-C is cut), the edgenode (headend node 24-A and/or tailend node 26-D) will transmit the activation messages to activate the protecting connection 32. By processing the activation messages, the intermediate nodes (28-E, 28-F, and 28-G) will program the switch fabric and configure the appropriate resources. Upon the completion of the activation, the edgenode (for example, headend node 24-A) will switch the user traffic to the protecting connection 32.

In general, logical tables in one or more databases may be used to support protecting connection 32 activation logic. Preferably, the tables include one or more connection tables, one or more logical timeslot tables, and one or more real timeslot tables. The connection table(s) maintains the connection-related information, including label, interfaces, and associated timeslot information for the connections. The logical timeslot table(s) is a timeslot translation table(s) between connections and timeslots. The real timeslot table(s) maintains the timeslot-related information, including the active connections that are currently conveying traffic and reserved connections for all timeslots. A reserved connection means there is not any active traffic on the timeslot. In the situation where a protecting connection 32 is identified in the connection table, the protecting connection's associated timeslots can be readily discovered utilizing the logic timeslot table and the real timeslot table.

If there is a consistent definition of priority levels among the paths throughout the mesh network 20, then, at activation time, each node 22 may rely on the priority levels to potentially preempt other paths.

The protecting connections 32 play an important role in Shared Mesh Protection. However, there is no standard method in detecting the liveliness and synchronizing the control plane and data plane on the protecting connections 32. Additionally, though providing Operation, Administration and Maintenance (OAM) on data connections, i.e. working connections 30, is a common practice in circuit and packet networks, there is no known method in applying OAM on protecting connections 32 that may or may not be active to transport user traffic.

Further, control plane and data plane synchronization is very important in Shared Mesh Protection (SMP) Operation, Administration and Maintenance. Without proper synchronization, user traffic could be directed to the wrong place and lost. For example, due to hardware or software errors (for instance, memory corruption) on an intermediate node 28, the Shared Mesh Protection activation messages may lead the protecting connection 32 to the wrong path at the data plane. This is commonly known as the "black hole" problem in network operation. Additionally, without some sort of control plane to data plane synchronization tool in place, operators cannot easily detect the failure of connections. Current methodologies to address the issue of the black hole problem for working connections 30 include LSP-ping (Reference RFC4379); however, methodology is needed to address the issue of the black hole problem for protecting connections 32.

SUMMARY OF THE DISCLOSURE

This disclosure defines a new system and method to support Operation, Administration and Maintenance (OAM) on protecting connections in a Shared Mesh Protection (SMP) environment.

In a version of the present disclosure, the system may perform query and diagnostics on a protecting connection that has not been activated and is not passing user traffic. This can be accomplished by probing the protecting connection to discover whether the resources that have been reserved for the protecting connection have been assigned to another connection.

In another version of the present disclosure, the system may perform query and diagnostics on a protecting connection that is currently activated and passing user traffic. This can be accomplished by probing the protecting connection with LSP-ping messages over in-band control channels in an end-to-end ping mode or in a hop-by-hop fashion, for example, with LSP-Traceroute mode. The system preferably synchronizes a control plane and a data plane on switch nodes forming the protecting connection.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 10b is a continuation of the diagram of FIG. 10a depicting the LSP-ping Echo Request process sequence, including an intermediate node and a tailend node.

DETAILED DESCRIPTION

Figure 1:
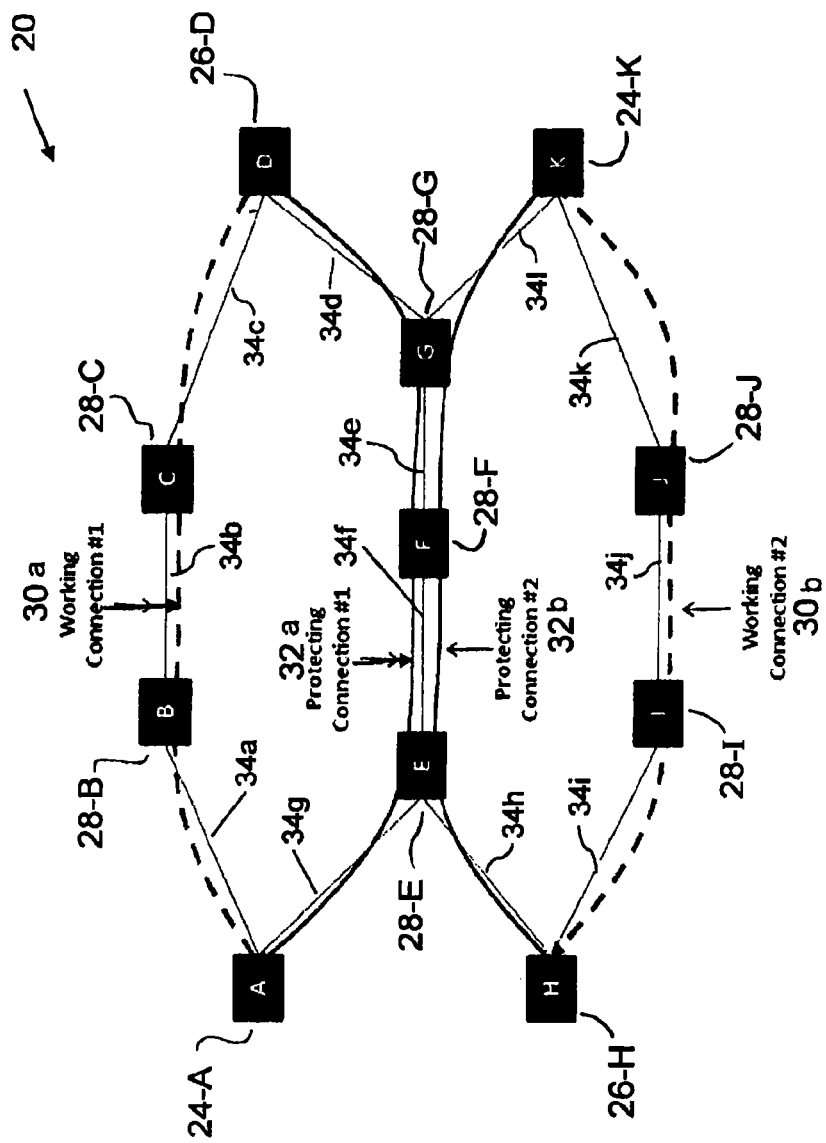
FIG. 1 is an example of a mesh network with Shared Mesh Protection.

The following detailed description refers to the accompanying drawings. The same reference numbers in different drawings may identify the same or similar elements.

The present disclosure relates to improvements in supporting Operation, Administration and Maintenance (OAM) on protecting connections in a Shared Mesh Protection environment. The disclosure addresses this in the following two aspects.

(1) Protecting Connection condition and diagnostics: to manage protecting connections 32 in the context of a Shared Mesh Protection Network, the operator can probe the protecting connections 32 while the protecting connections 32 are not passing user traffic and discover the traffic and health condition of the protecting connections 32. The probe may involve sending in-band messages to the intermediate nodes 28 of the protecting connections 32.

(2) Synchronization of control plane and data plane in the context of a Shared Mesh Protection Network by using LSP-ping messages on the protecting connections 32 in which the protecting connections 32 are provisioned at the control plane. Protecting connection 32 activation may take place between line modules at each intermediate node 28, while user traffic goes over the underlying data connections.

DEFINITIONS

If used throughout the description and the drawings, the following short terms have the following meanings unless otherwise stated:

CAC stands for Connection Admission Control.

DCC stands for Dedicated Data Communication Channels.

GCC stands for General Communication Channel which is an in-band side channel used to carry transmission management and signaling information within Optical Transport Network elements.

GACH stands for Generic Associated Channel Header.

GAL stands for Generic Associated Channel Label.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). GMPLS is a set of routing protocols which runs on a control module. The Generalized Multiprotocol Label Switching architecture is defined, for example, in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Multi-Protocol Label Switching network. Note that Label Switched Paths are typically unidirectional; LSPs enable packets to be label switched through the Multiprotocol Label Switched network from one endpoint to another. Since bidirectional communication is typically desired, a Label Switched Path is typically set up for each direction to compensate for the unidirectional nature of the Label Switched Path. Replies may be sent by way of control plane forwarding. However, Label Switched Paths may be bi-directional, allowing replies to be sent on the same bi-directional Label Switched Path that sends a query.

MPLS stands for Multi-Protocol Label Switching which is a scheme in telecommunications networks for carrying data from one switch node to the next switch node. MPLS operates at an OSI (Open System Interconnection) model layer that is generally considered to lie between traditional definitions of layer 2 (data link layer) and layer 3 (network layer) and is thus often referred to as a layer 2.5 protocol.

MPLS-TP is an abbreviation of Multiprotocol Label Switching-Transport Profile. MPLS-TP is a subset of MPLS intended to provide capabilities and management that is more similar to transport network operators than MPLS. Extensions of MPLS have been defined specifically for MPLS-TP, mostly in the area of operations and management; however MPLS-TP remains a subset or restricted usage of MPLS.

OAM stands for Operation, Administration and Maintenance.

OSI stands for Open System Interconnection which is a networking framework for implementing protocols in seven layers.

OTN stands for Optical Transport Network which includes a set of optical switches which are connected by optical fiber links.

SMP stands for Shared Mesh Protection.

SONET/SDH stands for Synchronous Optical Networking/Synchronous Digital Hierarchy which are standardized multiplexer protocols that transfer multiple digital bit streams over optical fiber using lasers or light emitting diodes.

Rx stands for Receiver which typically refers to optical channel receivers, but can also refer to circuit receivers.

SRLG stands for Shared Risk Link Group.

TTL stands for Time To Live and is a field in the header of a network packet (or message) that sets the number of hops through which the network packet or message travels.

Tx stands for Transmitter which typically refers to optical channel transmitters, but can also refer to circuit transmitters.

The terms SID, TID and PID refer to Slot Identification, TIM Identification and Port Identification, respectively. The terms SID, TID and PID are used to identify the system component for message delivery.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include "one or more", or "at least one". In other words, the singular also includes the plural, unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
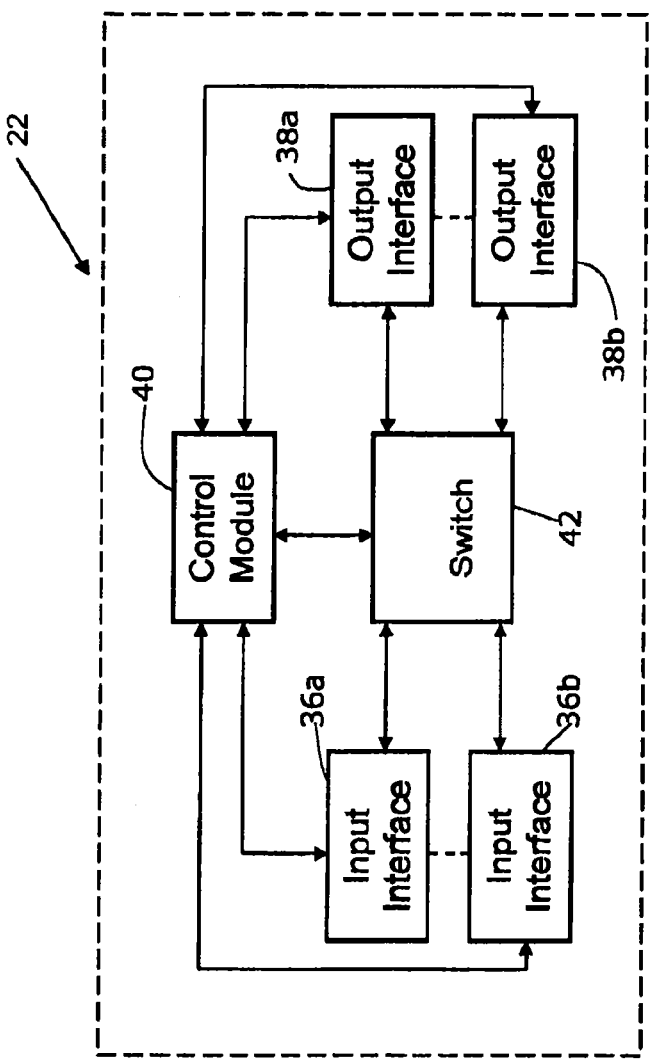
FIG. 2 is a block diagram of an exemplary node constructed in accordance with the present disclosure for communicating via the mesh network.

Referring now to the drawings, and in particular to FIG. 2, shown therein and designated by reference numeral 22 is an exemplary node constructed in accordance with the present disclosure. As will be discussed in more detail below, the node 22 is adapted to facilitate the communication of data (which may be referred to herein as "traffic") between multiple nodes 22 in a mesh network 20 (as shown in FIG. 1). The node 22 is provided with one or more input interfaces 36, one or more output interfaces 38, a control module 40, and a switch 42. The nodes A-K in FIG. 1 can be constructed in a similar manner as the node 22.

In general, the input interfaces 36 are adapted to receive traffic from the mesh network 20, and the output interfaces 38 are adapted to transmit traffic onto the mesh network 20. The switch 42 serves to communicate the traffic from the input interface(s) 36, to the output interface(s) 38. And, the control module 40 serves to control the operations of the input interfaces 36, the output interfaces 38, and the switch 42.

The control module 40 preferably runs GMPLS and can be referred to herein as a control plane 44. The control plane 44 preferably uses GMPLS protocols to setup one or more working connections 30 and one or more protecting connections 32 during a negotiation. During the negotiation between the control planes 44 of the nodes 22 within the mesh network 20 (as illustrated in FIG. 1), labels may be allocated for in-band signaling as part of the GMPLS processing.

The node 22 can be implemented in a variety of manners, including commercial installations having one or more back-planes (not shown), racks, and the like. In this example, the input interfaces 36, the output interfaces 38, the control module 40 and the switch 42 are typically implemented as separate devices, which may have their own power supply, local memory and processing equipment. In another example, the node 22 can be implemented as a single device having a shared power supply, memory and processing equipment. Or, in another example, the node 22 can be implemented in a modular manner in which one or more of the input interfaces 36, the output interfaces 38, the control module 40 and the switch 42 share a power supply and/or housing.

The input interfaces 36, and the output interfaces 38 of one node 22 are adapted to communicate with corresponding input interfaces 36, and output interfaces 38 of another node 22 within the mesh network 20 via a communication link 34 (as shown in FIG. 1). An example of an input interface 36 and/or an output interface 38 is an Ethernet card or optical port. In general, each of the input interfaces 36 and/or the output interfaces 38 may have a unique logical identification, such as an IP address. The communication link 34 can be implemented in a variety of manners, such as a physical link including electrical (e.g., copper wire or coax) and/or optical signal (e.g., optical fiber or other waveguide) carrying capabilities, or as a wireless link. The implementation of the input interfaces 36, and the output interfaces 38 will depend upon the particular type of communication link 34 that the particular input interface 36 and/or output interface 38 is designed to communicate with. For example, one of the input interfaces 36 can be designed to communicate wirelessly with another node 22 within the mesh network 20, while one of the output interfaces 38 of the node 22 can be designed to communicate optically through a fiber-optic link. For a particular node 22, the input interfaces 36 can be of the same type or different types; the output interfaces 38 can be of the same type or different types; and the input and output interfaces 36 and 38 can be of the same type or different types.

In accordance with the present disclosure, messages transmitted between the nodes A-K, can be processed by circuitry within the input interface(s) 36, and/or the output interface(s) 38 and/or the control module 40. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

It should be understood that the node 22 can be implemented in a variety of manners including those shown and discussed in U.S. Patent Application No. 20090245289 entitled "Programmable Time Division Multiplexed Switching" the entire content of which is hereby incorporated herein by reference.

Referring again to FIG. 1, upon detection of working connection 30a failure (for example, if the communication link 34b between 28-B and 28-C is cut), the edgenode (headend node 24-A and/or tailend node 26-D) will trigger activation messages to bring up the protecting connection 32a. By processing the activation messages, the intermediate nodes 28-E, 28-F, 28-G will program the switch fabric and configure the appropriate resources. Upon the completion of the activation, the edge node (for example, headend node 24-A) will switch the user traffic to the protecting connection 32a.

Shared-mesh restoration, as used herein, refers to a situation in which the operator(s) from the headend node 24 (for example, 24-A and/or 24-K) signal one or multiple protecting connections 32 for a particular working connection 30. Each protecting connection 32 reserves the timeslots on the intermediate nodes 28, but does not actually occupy them. The time slots may be shared by multiple protecting connections 32. Upon failure of the mesh network 20, the headend node 24 (for example, 24-A and/or 24-K) triggers activation messages to activate one of the protecting connections 32. The intermediate nodes 28-E, 28-F and/or 28-G will configure the timeslots, and the headend node 24 (for example, 24-A and/or 24-K) will switch the user traffic over to the protecting connection 32 upon the completion of the activation sequences. Each protecting connection 32 is likely established over a set of nodes 22 that may be shared by multiple other working connections 30 and/or protecting connections 32.

If there is a consistent definition of priority levels among the paths throughout the mesh network 20, then, at activation time, each node 22 may rely on the priority levels to potentially preempt other paths.

Protecting Connection Query and Diagnostics

One aspect of the present disclosure is a query and diagnostics algorithm for determining the status of an un-activated protecting connection 32, in which timeslots are reserved but not activated. The process could also be used to determine status of an activated protecting connection 32, in which timeslots are activated. In one embodiment, each headend node 24 periodically probes nodes 22 of the protecting connections 32 to query about resource availability. If a reserved resource on a particular connection has been taken by others, the headend node 24 may change the path of the protecting connection 32 to an alternative path. In another embodiment, an operator may use the query as an on-demand diagnostic through user input. The operator may send the probing messages from the headend node 24 to check on the protecting connection 32 to determine whether the protection failure exists.

Figure 3:
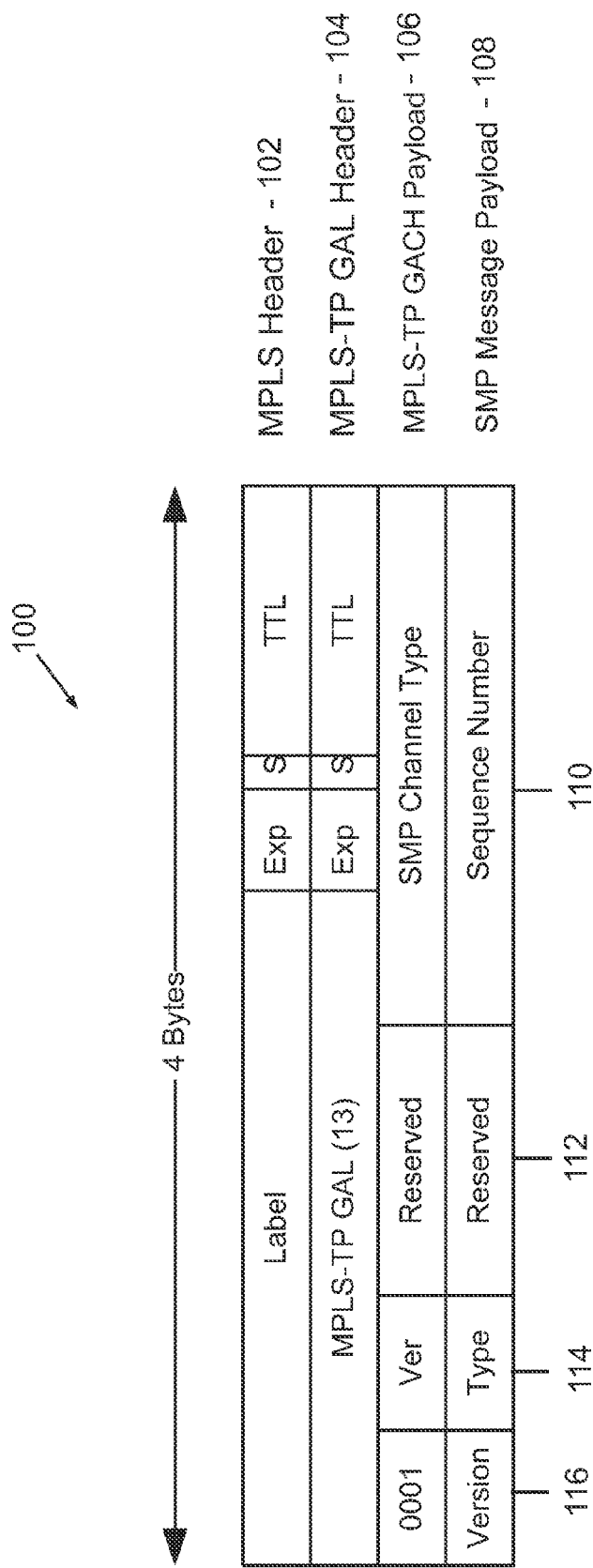
FIG. 3 is an example of a Shared Mesh Protection query message.

Referring now to FIG. 3, shown therein is an illustration of one method of forming a protecting connection 32 Query message 100. In this embodiment, the Query message 100 contains a MPLS Header 102, MPLS-TP GAL Header 104, MPLS-TP GACH Payload 106, and Shared Mesh Protection (SMP) Message Payload 108. The MPLS Header 102 provides the message forwarding function between the nodes 22. The MPLS Header 102 is more fully described in Reference RFC3032. The MPLS-TP GAL Header 104 and the MPLS-TP GACH Payload 106 are more fully described in Reference RFC5586.

The SMP Message Payload 108 may be inside the MPLS-TP GAL Header 104. The SMP Message Payload 108 may include one or more commands to initiate Operation, Administration and maintenance (OAM) operations. In one embodiment, the SMP Message Payload 108 carries a Sequence Number 110, a Reserved 112 field a Type 114 field, and a Version 116 field. The Sequence Number 110 is used for reliable messaging. The Version 116 may be a value of one, and the Reserved 112 may be zero initially. To query a protecting connection 32, the Type 114 field may be GET with a value of three, for example. However, it will be understood that other types and values can be used.

Figure 4:
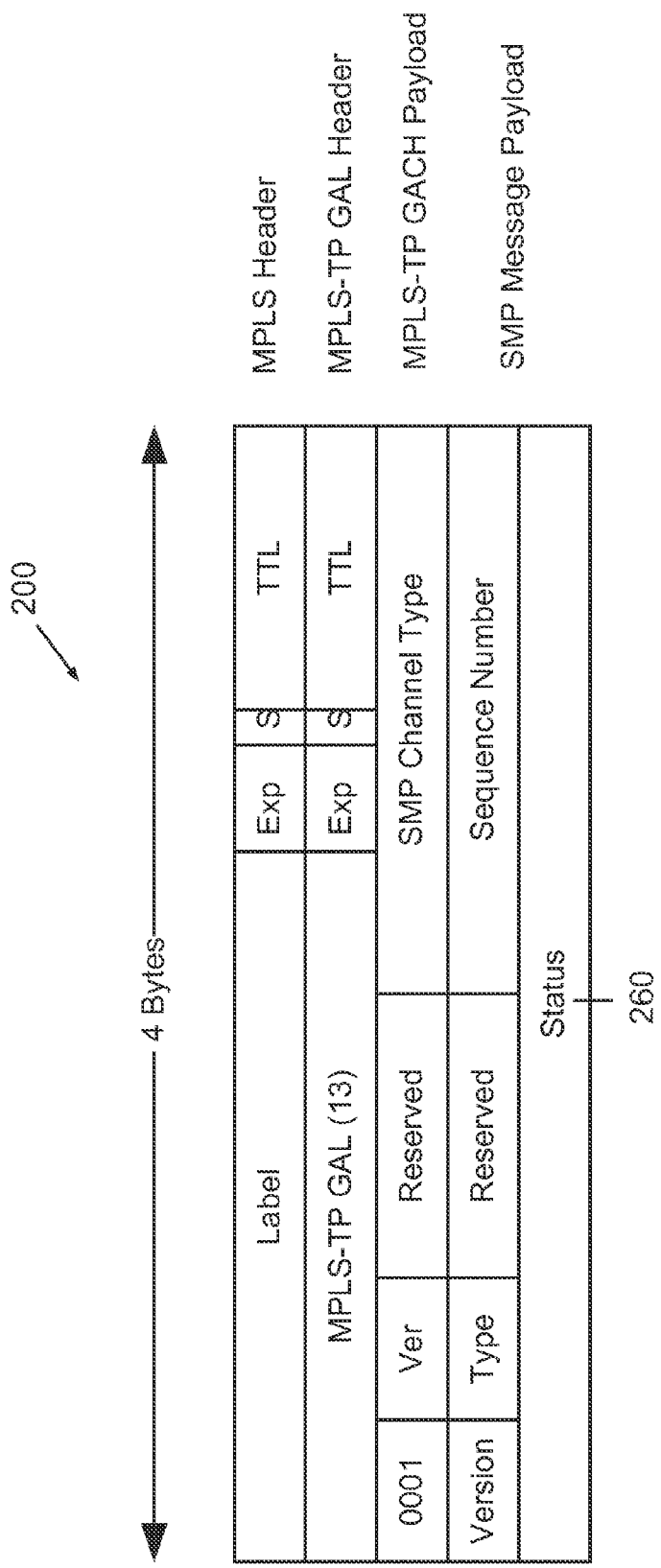
FIG. 4 is an example of a Shared Mesh Protection query reply message.
Figure 5:
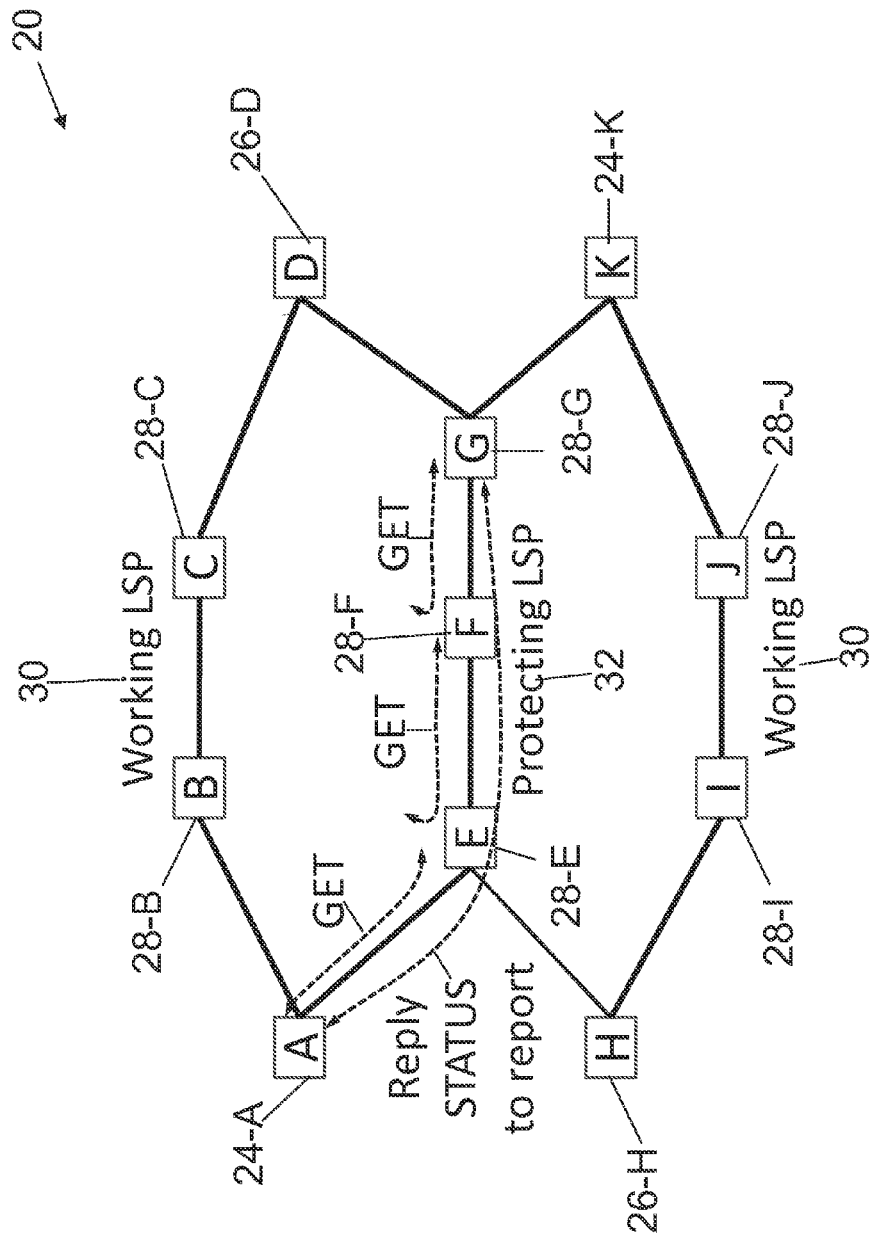
FIG. 5 illustrates an example of the probing/querying procedure in the Mesh Network depicted in FIG. 1 over a protecting connection.

During querying or probing, the intermediate nodes 28-E, 28-F, 28-G or the protecting connection 32 will acknowledge the query or probe with a STATUS message 200, an example of which is shown in FIG. 4. The STATUS message 200 has a Status Code 260 used for acknowledging and preemption notification. The STATUS code 260 may be in any format, but in one embodiment, the STATUS code 260 has the following definition:

1xx: OK
    100: hop-by-hop ack
    101: end-to-end ack
2xx: message processing errors
    201: no such path
3xx: processing issues:
    301: no more resource for the path
    302: pre-empted by another path
    303: system failure
4xx: informative data:
    401: shared resource has been taken by other paths FIG. 5 illustrates an example of the probing procedure in the mesh network 20 over protecting connections 32. The Query message 100, or other similar probing message, may be sent by a node 22 to check on protecting connections 32 that have been configured at control plane 44 but not on the data plane 46. The Query message 100 may be used to check on the data plane 46, through the control plane 44, to determine that the data plane 46 may be functional, in the event of mesh network 20, or working connection 30, failure. In one embodiment, to check on the protecting connections 32, periodically or on-demand, the operators may trigger the Query message 100 wherein the Type 114 field is GET with a value of three, for example. The processing of this Query message 100 at the intermediate nodes 28-E, 28-F, 28-G in the protecting connection 32 preferably is not intrusive and does not make changes to the intermediate node 28 switches 42. If the resource at the intermediate node 28-E, 28-F, 28-G is not available (due to pre-emption, for example), the intermediate node 28-E, 28-F, 28-G reports the failure with a STATUS message 200 where the Status Code 260 has a value indicating the failure. In the example illustrated in FIG. 5, if the intermediate node 28-G is unavailable, then the STATUS message 200 would be returned to the headend node 24-A with a Status Code 260 value of "301" indicating there is no resource available for the protecting connection 32.

Figure 6:
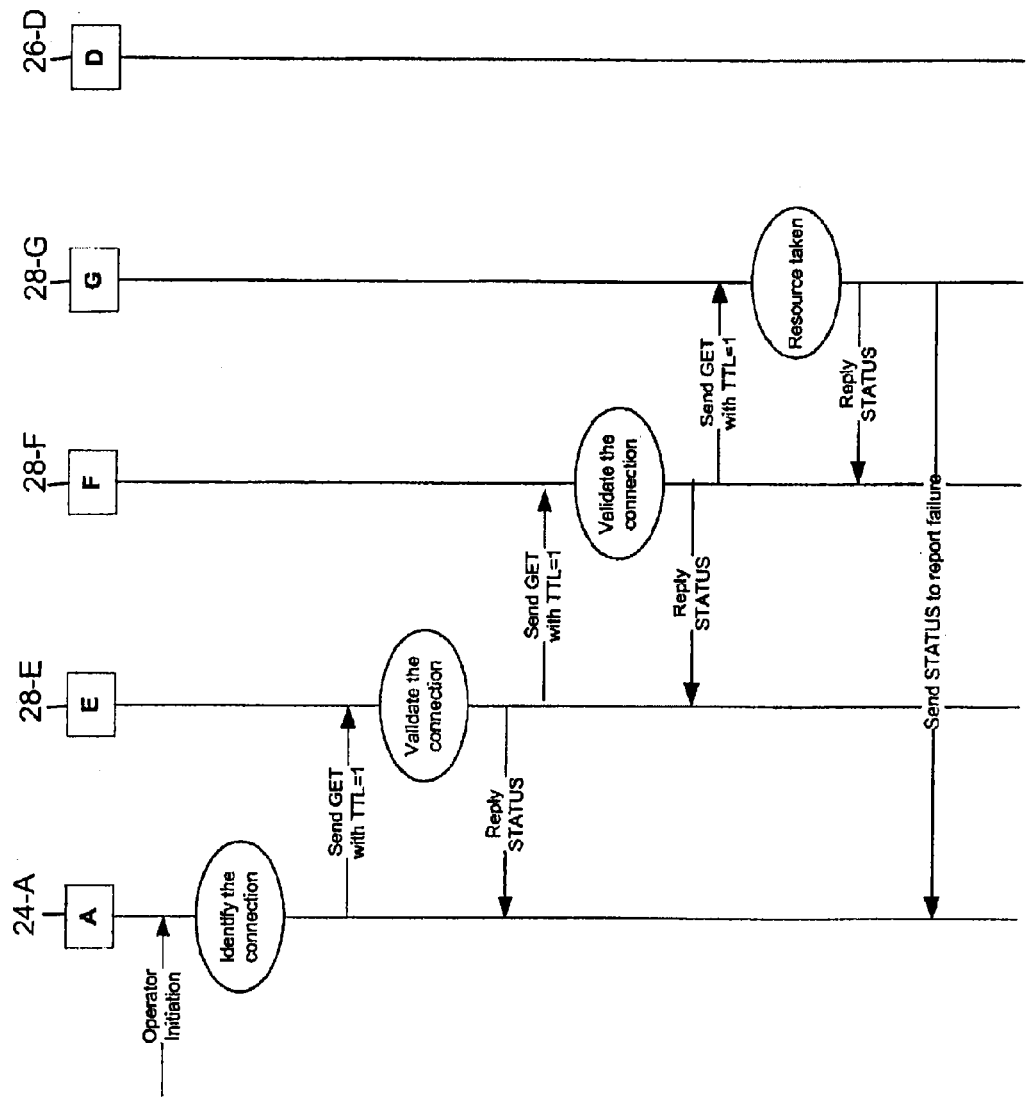
FIG. 6 is a diagram of a query of a protecting connection with a detected failure.

FIG. 6 further illustrates the action of each node 22 in the protecting connection 32 during a protecting connection 32 query. This diagram is an example of the process when the intermediate node 28-G is unavailable. Here the intermediate nodes 28-E, 28-F, 28-G validate the protecting connection 32 by determining the availability of the resources of the protecting connection 32 in logical tables in one or more associated database(s) without making changes to the switches 42 of the intermediate nodes 28-E, 28-F, and 28-G. Typically, the intermediate nodes 28 maintain resource usage tables for communication links 34 in the mesh network 20. When an intermediate node 28 receives a Query message 100, or other similar message, the intermediate node 28 determines the required resources associated with the Query message 100 and compares the required resources against a resource usage table for the associated communication link 34.

In the example illustrated in FIG. 6, the operator initiates the probe at headend node 24-A. Headend node 24-A identifies the protecting connection 32 and sends a Query message 100 where Type 114 field has a value of GET and TTL=1. The Time to Live (TTL) field may be used to control how far a message may travel in the mesh network 20. In packet networks, each node 22 that receives the packet may be responsible for decreasing the TTL value by one. If a node 22 receives a TTL value of zero, then the packet may be dropped. If a node 22 receives a TTL value of one, then the packet may be forwarded to the control plane 44 for special processing. If a node 22 receives a TTL value greater than one, the packet may be forwarded at the data plane 46 without further processing. In the embodiment illustrated in FIG. 6, if the TTL value is one, the Query message 100 may be delivered and processed at the next hop, i.e. the next node 22 in the mesh network 20 path.

Continuing with the example illustrated in FIG. 6, intermediate node 28-E validates the protecting connection 32 and sends a reply STATUS message 200 to headend node 24-A denoting its availability. Intermediate node 28-E also sends a Query message 100 to the next intermediate node 28-F, again where Type 114 field has a value of GET and TTL=1. Intermediate node 28-F validates the connection and sends a reply STATUS message 200 to intermediate node 28-E denoting its availability. Intermediate node 28-F sends a Query message 100 to the next intermediate node 28-G, again where Type 114 field has a value of GET and TTL=1.

In this example, the resource on intermediate node 28-G has been taken by a higher priority connection, and therefore intermediate node 28-G sends a STATUS message 200 back to the headend node 24-A. In this scenario, the Status Code 260 would carry a value of "301" and the field MPLS TTL 354 would carry "0xFF". Using a value of "0xFF" in the MPLS TTL 354 field means the reply STATUS messages 200 are delivered to the headend node 24-A without hop-by-hop processing. Based on the received TTL, the headend node 24-A may determine where the failure/query has taken place by calculating the difference in the value of the failure TTL (0xFF) and the received TTL values. The difference indicates how may hops away the failure/query took place. Intermediate node 28-G also may send a reply STATUS message 200 back to intermediate node 28-F.

In this example, the headend node 24-A would have learned that the resources on the intermediate node 28-G are no longer available and may use this information to cancel the protecting connection 32 and calculate another protecting connection 32.

Synchronization Through LSP-Ping Support on Protecting Connections

Figure 7:
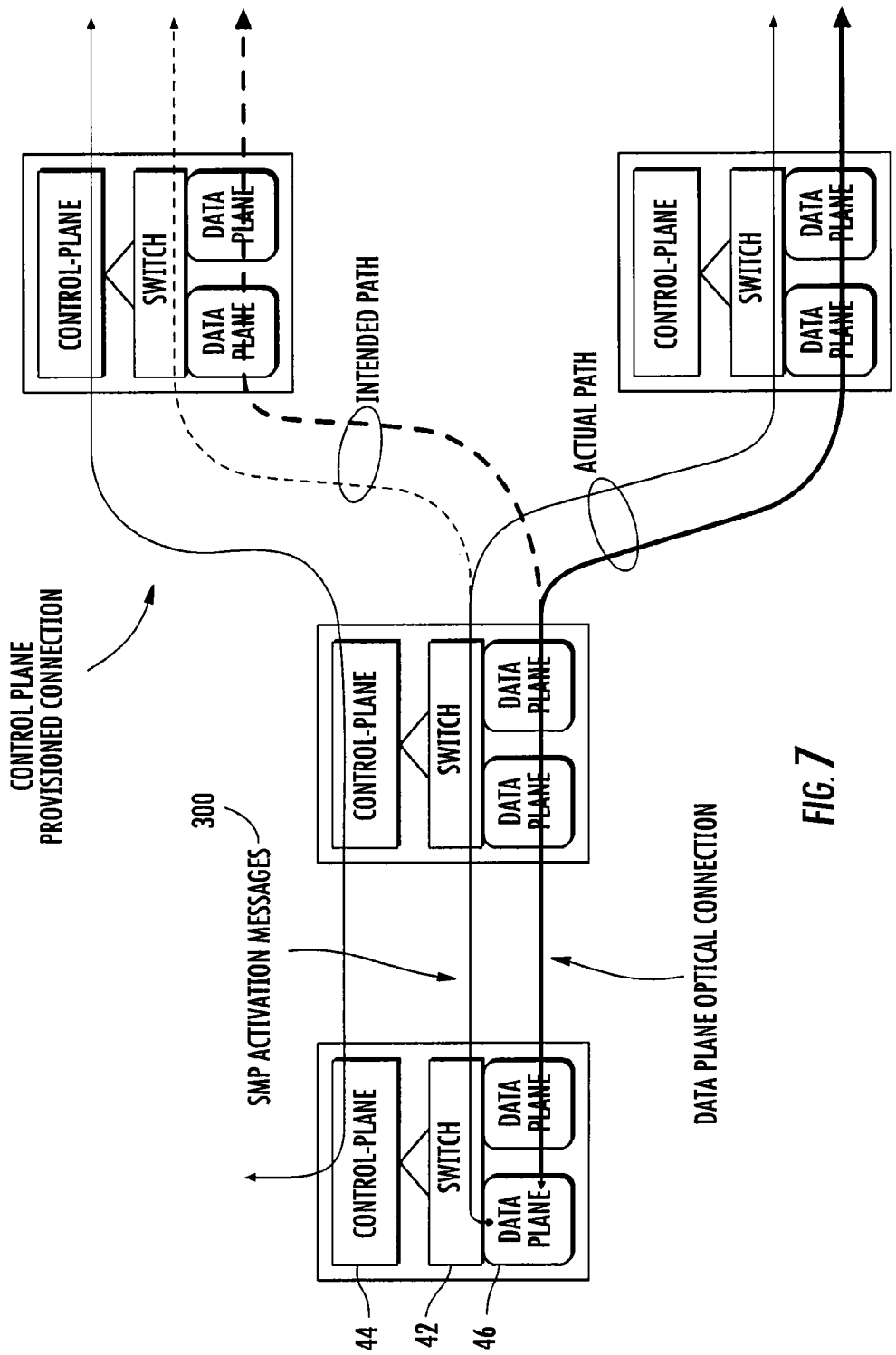
FIG. 7 illustrates the condition of a Shared Mesh Protection network in which the data plane and the control plane are not synchronized (the "black-hole" problem).

Another aspect of the disclosure describes a synchronization algorithm to support Operation, Administration and Maintenance (OAM) on Shared Mesh Protection (SMP) networks. The synchronization algorithm synchronizes the data plane 46 and the control plane 44 through a LSP-ping support on protecting connections 32 that have been activated and are passing user traffic. FIG. 7 illustrates the condition of the mesh network 20 in which the data plane 46 and the control plane 44 are not synchronized. Due to hardware/software errors such as memory corruption on one of the intermediate nodes 28, the SMP activation messages 300 may lead the protecting connection 32 to the wrong path at the data plane 46, creating the "black hole" problem previously discussed. Synchronization, as described below, can be used to ensure that the SMP activation messages 300 are received correctly. The protecting connection 32 may be passing user traffic during synchronization.

During GMPLS setup in the mesh network 20, including routing and signaling, the nodes 22 in the mesh network 20 contain network resource topology, and connection information, including protecting connection identification data 370, passing through the node 22. The information is stored in control plane 44 in a connection database, or similar system. LSP-ping messages 350, carrying the protecting connection identification data 370, may be passed through data plane 46 on the connection and sent to the control plane 44 for connection validation.

Synchronization of the data plane 46 and the control plane 44 may begin with testing the protecting connection 32. To test a protecting connection 32, the headend node 24 constructs and transmits LSP-ping messages 350. LSP-ping messages 350 are packets having a data structure similar to MPLS-labeled messages that are passed on the protecting connection 32. The intermediate nodes 28 receive and switch the LSP-ping messages 350 toward the tailend node 26. Each LSP-ping message 350 carries protecting connection identification data 370 which will be described below. When the LSP-ping messages 350 arrive at the tailend node 26, the tailend node 26 reads the LSP-ping messages 350 and validates the protecting connection identification data 370 against data stored in the connection database.

The tailend node 26 then replies back to the headend node 24. If the headend node 24 does not receive the reply within a pre-determined time period after transmitting the LSP-ping message 350, or receives errors in the returned messages, the headend node 24 knows the protecting connection 32 has failed. A timer that has the ability to track the pre-determined time period can be activated and controlled by the control plane 44, or by other methodology.

Figure 8:
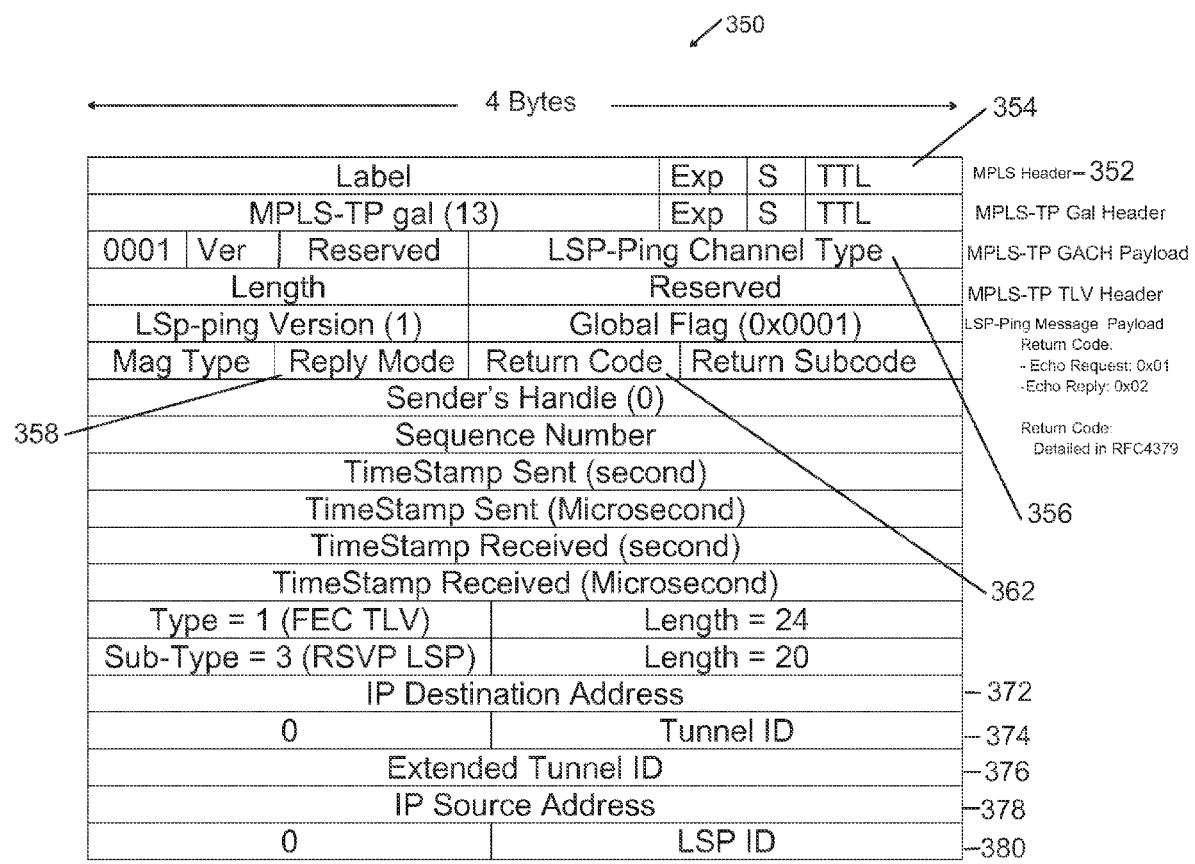
FIG. 8 is an example of a LSP-ping message format.

FIG. 8 is an example of the LSP-ping message 350. In this embodiment, the LSP-ping messages 350 are encapsulated and forwarded with the MPLS labels 325 reserved for the protecting connection 32. The LSP-ping message 350 has MPLS headers 352 with a TTL 354 value to control the distance that the message will travel, as well as an LSP-ping Channel Type 356 field to identify the LSP-ping message 350.

The LSP-ping message 350 also contains a Reply Mode 358 field which may contain a value of "4", which indicates that the LSP-ping Replies 360 use the bi-directional LSP for the protecting connection 32. The LSP-ping message 350 also holds Return Code 362 field which indicates which direction the LSP-ping messages 350 go. If the Return Code 362 holds a value of Echo Request 0x01, for example, then the LSP-ping message 350 is a LSP-ping Echo Request 364 which comes from the headend node 24. If the Return Code 362 holds a value of Echo Reply 0x02, then the LSP-ping message 350 is a LSP-ping Echo Reply 366 which goes toward the headend node 24.

Additionally, the LSP-ping messages 350 may contain the protecting connection identification data 370 used by the control plane 44 during setup. This connection identification data 370 may include an IP Destination Address 372, a Tunnel ID 374, an Extended Tunnel ID 376, an IP Source Address 378, and an LSP-ID 380. The protecting connection identification data 370 are exchanged in GMPLS signaling protocol for protecting connection 32 setup.

In processing a LSP-ping message 350, the switch 42 is responsible for validating the MPLS labels 325. If the LSP-ping message 350 does not have the appropriate MPLS label 325 information, the switch 42 may discard the LSP-ping message 350 silently, for example, without passing a reply or error message. Alternately, if a LSP-ping message 350 does not have the appropriate MPLS labels 325 information, the switch 42 may reply with an explicit error message.

In processing a LSP-ping message 350, the control plane 44 is responsible for validating the protecting connection identification data 370 and replies with the appropriate response to the headend node 24.

The LSP-ping messages 350 typically traverse through the exact MPLS path for the corresponding SMP activation messages. The headend nodes 24 preferably inject the LSP-ping packets from the ingress switch 42a with the appropriate MPLS labels 325. The switches 42 on the intermediate nodes 28 preferably receive and transmit LSP-ping messages 350.

Figure 9:
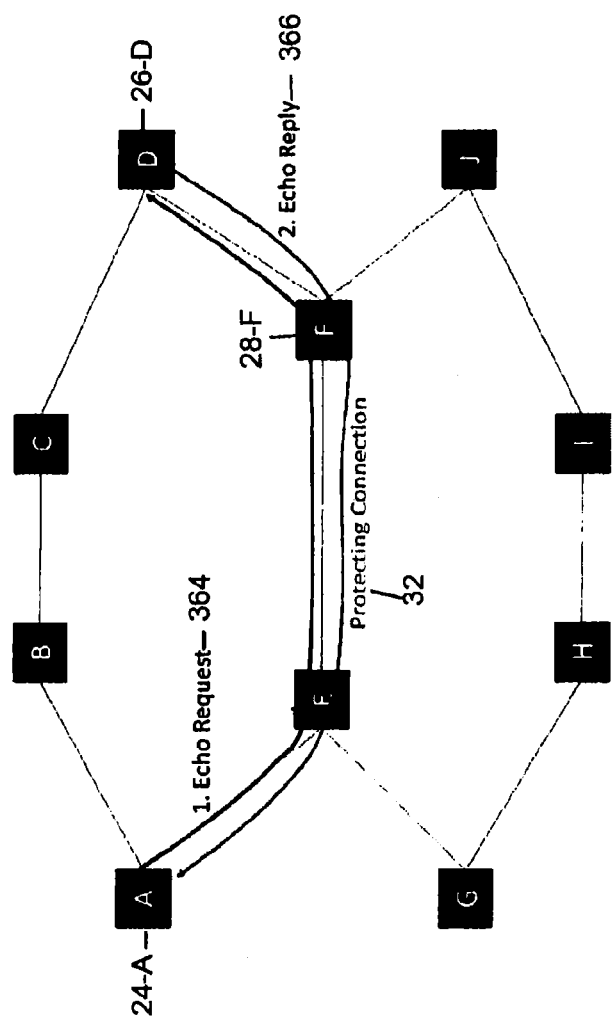
FIG. 9 illustrates an example of a LSP-ping process sequence over a protecting connection in the Mesh Network depicted in FIG. 1.

FIG. 9 illustrates a typical LSP-ping application over the mesh network 20. First, in this example, the operator sends the LSP-ping Echo Request 364 from the headend node 24-A. The LSP-ping Echo Request 364 switches on intermediate nodes 28-E and 28-F before reaching the final destination of tailend node 26-D. Upon validation of the protecting connection identification data 370, the tailend node 26-D returns the LSP-ping Echo Reply 366. When headend node 24-A receives the LSP-ping Echo Reply 366, the headend node 24-A can determine the connectivity and health of the protecting connection 32, nodes 24-A through 26-D. A mis-connect on the switch will be determined by headend node 24-A if the mis-connect information is contained in the LSP-ping Echo Reply 366 or if there is a request time-out, for example, if the headend node 24-A does not receive the LSP-ping Echo Reply 366 within a pre-determined time period after transmitting the LSP-ping Echo Request 364.

Figure 10A:
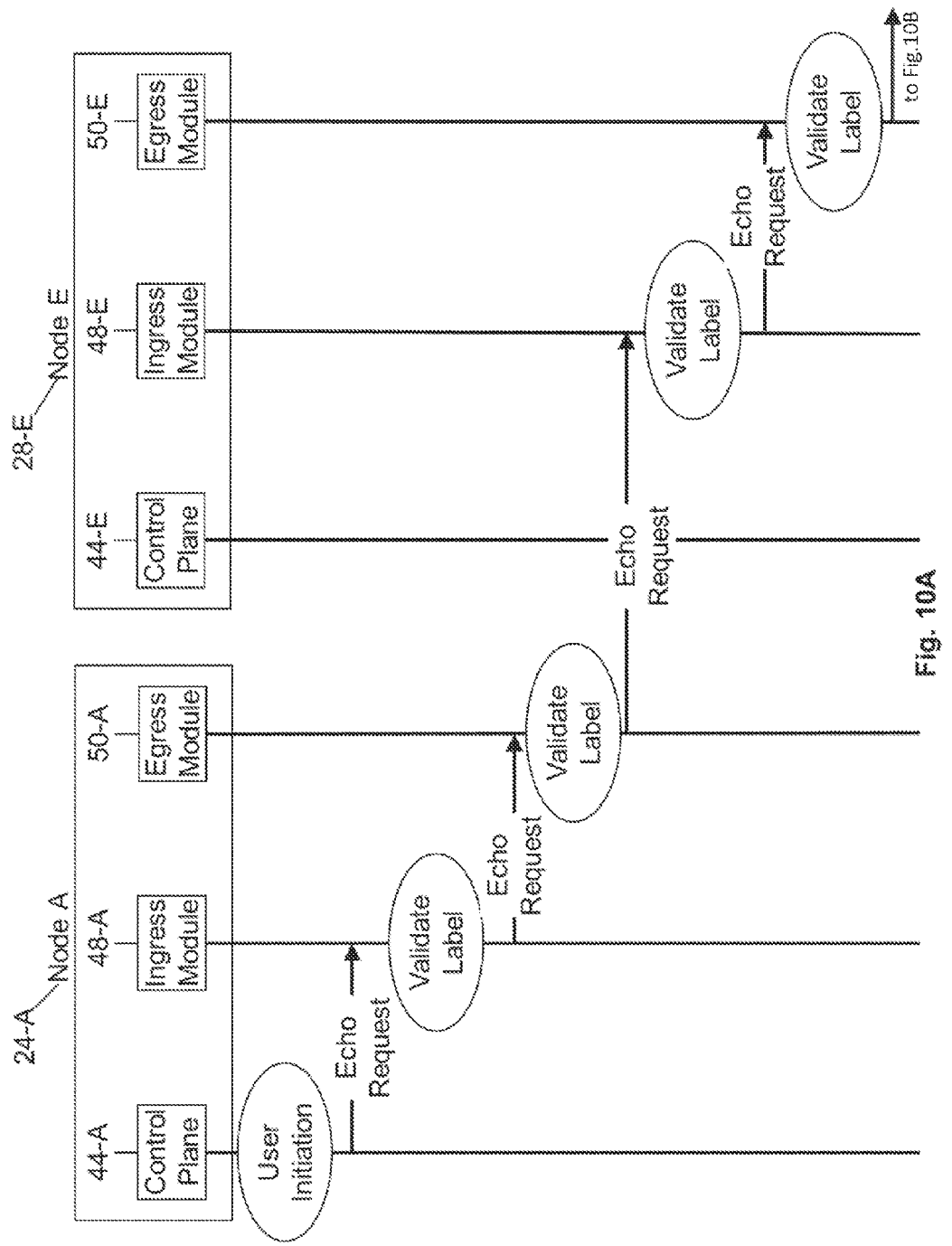
FIG. 10a is a partial diagram of the LSP-ping Echo Request process sequence, including a headend node and an intermediate node.

FIG. 10a is a partial diagram of the LSP-ping Echo Request process sequence 364 in the mesh network 20, including a headend node 24-A and an intermediate node 28-E. The LSP-ping Echo Request 364 is typically initiated from the headend node 24-A control plane 44-A and injected at an ingress module 48-A of the protecting connection 32 (i.e. the head of the protecting connection 32). This ensures that the LSP-ping Echo Request 364 will go through the same path of the corresponding SMP activation messages 300.

Each intermediate node 28 typically validates the MPLS labels 325 and switches the message from an ingress module 48 and an egress module 50. In general, the ingress module can be formed by one of the input interfaces 36 of the node 22, and the egress module can be formed by one of the output interfaces 38 of the node 22. The processing on the intermediate nodes 28 may not involve the control plane 44.

FIG. 10b is a continuation of the diagram of FIG. 10a depicting the LSP-ping Echo Request process sequence 364 in the mesh network 20, including an intermediate node 28-F and a tailend node 26-D. At the tailend node 26-D, the LSP-ping Echo Request 364 is forwarded to a control plane 44-D from an egress module 50-D. Then, at the tailend node 26-D, the control plane 44-D can validate the protecting connection identification data 370 against the information provided by GMPLS.

Figure 11A:
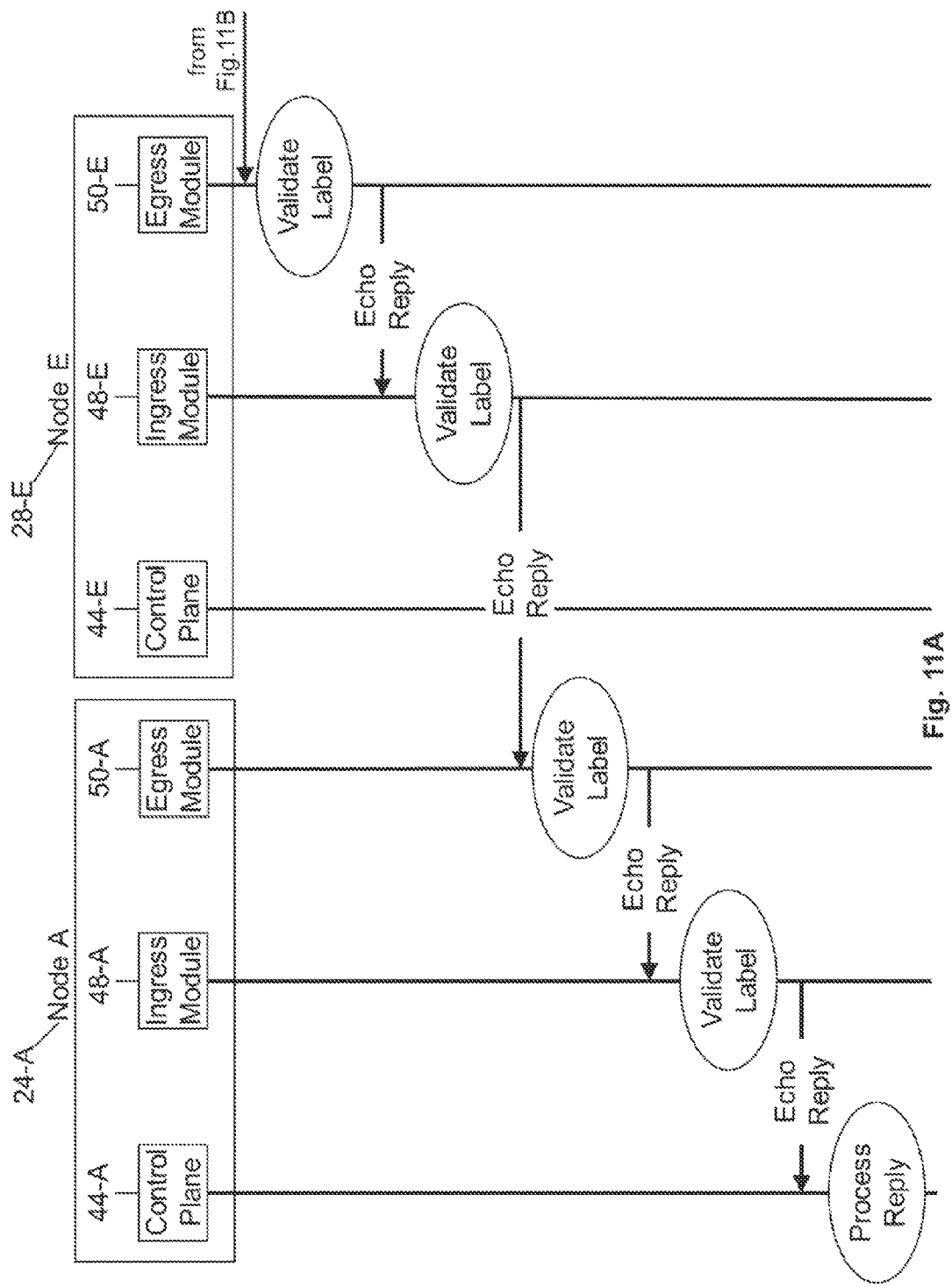
FIG. 11a is a partial diagram of a LSP-ping Echo Reply process sequence, including a headend node and an intermediate node.

FIG. 11a is a partial diagram illustrating a LSP-ping Echo Reply 366 process sequence, including a headend node 24-A and an intermediate node 28-E. The LSP-ping Echo Reply 366 may be delivered in multiple ways. In the context of SMP, the LSP-ping Echo Reply 366 preferably uses the bi-directional LSP's established by GMPLS for SMP activation messages 300. The LSP-ping message 350 preferably has the Reply Mode 358 field hold a value of "4" to support this method. The reply may be sent back through the bi-directional LSP.

The process sequence for the LSP-ping Echo Reply 366 starts with the tailend node 26-D. The LSP-ping Echo Reply 366 is sent from the control plane 44-D to an egress module 50-D where the label is validated. The LSP-ping Echo Reply 366 is then sent to an ingress module 48-D which switches it to the intermediate node 28-F egress module 50-F. The LSP-ping Echo Reply 366 is validated and sent to an ingress module 48-F which validates and sends the LSP-ping Echo Reply 366 on to intermediate node 28-E egress module 50-A.

Figure 11B:
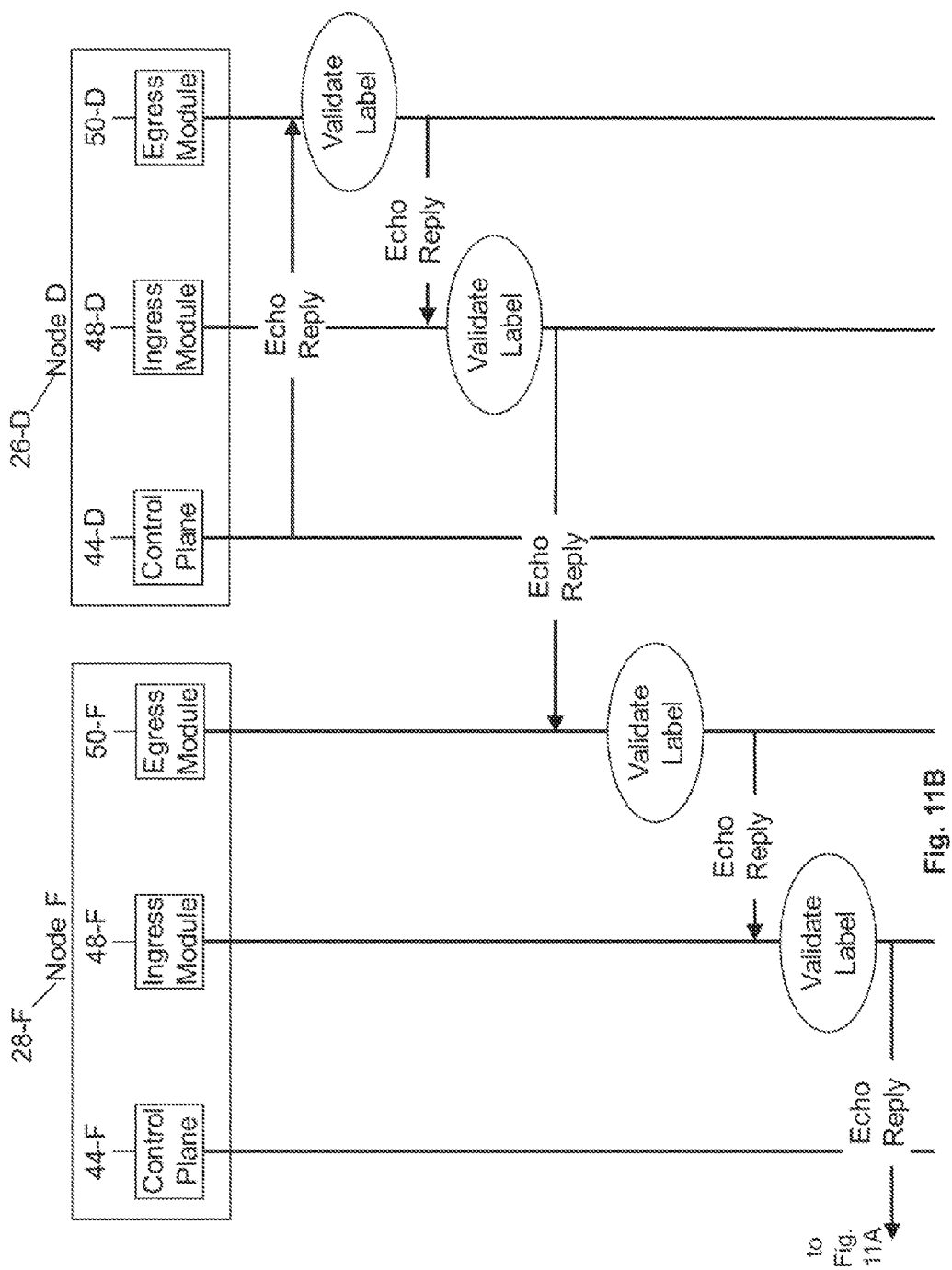
FIG. 11b, is a continuation of the diagram of FIG. 11a depicting a LSP-ping Echo Reply process sequence, including an intermediate node and a tailend node.

As shown in FIG. 11b, which is a continuation of the diagram of FIG. 11a, this process is repeated until the LSP-ping Echo Reply 366 reaches the headend node 24-A ingress module 48-A at which point the LSP-ping Echo Reply 366 is forwarded to the control plane 44-A for further processing. The headend node 24-A examines the returned messages and logs or displays the message for/to mesh network 20 operators.

Figure 12:
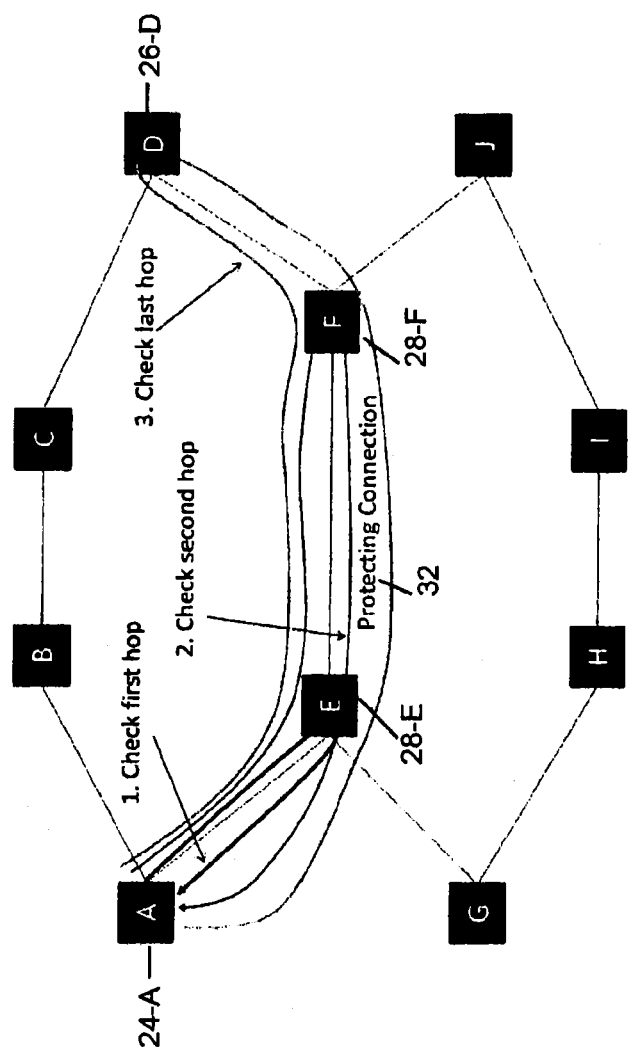
FIG. 12 illustrates an example of a LSP-Traceroute process sequence over a protecting connection in the mesh network of FIG. 1.

Another embodiment may enable operators to validate the protecting connection 32 hop-by-hop in LSP-Traceroute, as illustrated in FIG. 12. To check the protecting connection 32 by hops, the headend node 24-A may initiate LSP-ping messages 350 with a TTL 354 field value equal to 1, 2, 3, or any number equal to the number of desired hops. This forces the LSP-ping messages 350 to be processed on the intermediate nodes 28. For example, by having a TTL 354 field value equal to "1" on the MPLS Header 352, the LSP-ping message 350 may be stopped on intermediate node 28-E for processing. Similarly, setting the TTL 354 field value equal to "2" requires the processing of the LSP-ping message 350 on intermediate node 28-F, and so on.

The foregoing description provides illustration and description, but is not intended to be exhaustive or to limit the disclosure to the precise form disclosed. Modifications and variations are possible in light of the above teachings or may be acquired from practice of the disclosure.

Even though particular combinations of features are recited in the claims and/or disclosed in the specification, these combinations are not intended to be limiting. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes 22. In this situation, the nodes 22 may include communication paths to obtain the connection information from the centralized memory.

REFERENCES

The following references are hereby incorporated herein by reference:
RFC4872 RSVP-TE Extensions for E2E GMPLS Recovery, J. P. Lang, Y. Rekhter, D. Papadimitriou, The Internet Society, May 2007.
ITU-T Recommendation G.709 "Interfaces for the optical transport network (OTN)"
RFC3473 Generalized Multi-Protocol Label Switching (GMPLS) Signaling Resource ReserVation Protocol-Traffic Engineering (RSVP-TE) Extensions, Berger (Ed.), The Internet Society, January 2003.
RFC3032 MPLS Label Stack Encoding, E. Rosen, D. Tappan, G. Fedorkow, Y. Rekhter, D. Farinacci, T. Li, A. Conta, The Internet Society, January 2001.
RFC5586 MPLS Generic Associated Channel, Vigoureux, M., Bocci, M., Swallow, G., Aggarwal, R., and D. Ward, The Internet Society, May 2009.
RFC4379 Detecting Multi-Protocol Label Switched (MPLS) Data Plane Failures, Kombella, K. and Swallow, G., The Internet Society, February 2006.

What is claimed is:

1. A method comprising the steps of:
sending, with first circuitry in a first node in a mesh network, a query message on a protection path including a second node in the mesh network, the protection path having a resource reserved by the second node, the query message including a first header, a second header, a first payload and a second payload, the second payload including commands, such that, in response to the commands, the second node performs operation, administration and maintenance (OAM) operations; and
receiving, with second circuitry in the first node, a reply message from the second node in response to the query message, wherein the reply message is indicative of an availability of the resource, the reply message further indicating whether the resource is pre-empted by another path in the mesh network.

2. The method of claim 1, wherein the query message is a GET message.

3. The method of claim 1, wherein the step of sending is defined further as sending the query message on the protection path while the protection path does not carry user traffic.

4. The method of claim 1, wherein the protection path includes an intermediate node and a tailend node, and wherein the second node is at least one of the intermediate node and the tailend node.

5. The method of claim 1, wherein the mesh network includes a third node, and wherein the query message is passed from the second node to the third node, the query message having a time to live field equal to 1.

6. The method of claim 1, wherein the protection path is a first path and said another path is a second path and wherein the reply message indicates that the resources are unavailable, and wherein the method further comprises the step of reserving resources within the mesh network to form a third protection path through the mesh network.

7. The method of claim 1, wherein the circuitry of the first node periodically sends the query message to the second node.

8. The method of claim 1, wherein the query message is sent in response to a user input supplied to the first node.

9. The method of claim 3, wherein the protection path includes an intermediate node and a tailend node, and wherein the second node is at least one of the intermediate node and the tailend node.

10. The method of claim 3, wherein the mesh network includes a third node, and wherein the query message is passed from the second node to the third node, the query message having a time to live field equal to 1.

11. The method of claim 3, wherein the protection path is a first path and said another path is a second path and wherein the reply message indicates that the resources are unavailable, and wherein the method further comprises the step of reserving resources within the mesh network to form a third protection path through the mesh network.

12. The method of claim 3, wherein the circuitry of the first node periodically sends the query message to the second node.

13. The method of claim 3, wherein the query message is sent in response to a user input supplied to the first node.

14. A method comprising the steps of:
receiving, with first circuitry in a first node in a mesh network, a query message on a protection path including a second node in the mesh network, the protection path having a resource reserved by the second node, the query message including a first header, a second header, a first payload and a second payload, the second payload including commands, such that, in response to the commands, the first node performs operation, administration and maintenance (OAM) operations;
determining, with second circuitry in the first node, from information in a database, availability of the resource by the first node; and
transmitting, with third circuitry in the first node, a reply message to the second node in response to the query message, wherein the reply message is indicative of an availability of the resource for the protection path on the first node, the reply message further indicating whether the resource is pre-empted by another path in the mesh network.

15. The method of claim 14, wherein the query message is a GET message.

16. The method of claim 14, wherein the step of sending is defined further as sending the query message on the protection path while the protection path does not carry user traffic.

17. The method of claim 14, wherein the step of determining the availability of the resource, further includes querying the database to determine an allocation of the resource and comparing the allocation of the resource to data indicative of the protection path.

18. The method of claim 14, wherein the step of determining the availability of the resource, further includes determining the availability of the resource without storing data in the database to reallocate the resource.

19. The method of claim 16, wherein the step of determining the availability of the resource, further includes querying the database to determine an allocation of the resource and comparing the allocation of the resource to data indicative of the protection path.

20. The method of claim 16, wherein the step of determining the availability of the resource, further includes determining the availability of the resource without storing data in the database to reallocate the resource.

21. A node, comprising:
a first node having an output interface for transmitting traffic to a first communication link, wherein the output interface is configured to send a query message to at least one of a second node of a mesh network in a protection path, the protection path being a path through the mesh network, the protection path having at least one resource reserved by the second node, the query message including a first header, a second header, a first payload and a second payload, the second payload including commands, such that, in response to the commands, the second node performs operation, administration and maintenance (OAM) operations;
the first node having an input interface for receiving user traffic from a second communication link, wherein the input interface is configured to receive a reply message from the second node in response to the query message, wherein the reply message denotes availability of at least one resource for the protection path on the second node, the reply message further indicating whether the at least one resource is pre-empted by another path in the mesh network; and
a switch for communicating the user traffic from the input interface to the output interface; and a control module utilizing GMPLS protocols and controlling the input interface, the output interface and the switch, the control module storing connection data indicative of the protection path.

22. The node of claim 21, wherein the query message is a GET message.

23. The node of claim 21, wherein the protection path is un-activated and not passing user traffic.

* * * * *